(12) United States Patent
Beckett et al.

(10) Patent No.: US 6,317,214 B1
(45) Date of Patent: Nov. 13, 2001

(54) METHOD AND APPARATUS TO DETERMINE A MEASUREMENT OF OPTICAL MULTIPLE PATH INTERFERENCE

(75) Inventors: Douglas James Beckett, Kanata (CA); Ronqqing Hui, Lawrence, KS (US)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/217,909

(22) Filed: Dec. 22, 1998

(51) Int. Cl.[7] ....................................................... G01B 9/02
(52) U.S. Cl. ........................ 356/450; 356/477; 356/483; 356/73.1
(58) Field of Search ................................... 356/483, 477, 356/73.1, 450

(56) References Cited

U.S. PATENT DOCUMENTS

| | | | |
|---|---|---|---|
| 5,291,267 | * | 3/1994 | Sorin et al. .......................... 356/345 |
| 5,617,200 | | 4/1997 | Vance ................................... 356/73.1 |

* cited by examiner

Primary Examiner—Frank G. Font
Assistant Examiner—Andrew H. Lee

(57) ABSTRACT

A method and apparatus for measuring the magnitude of multiple path interference (MPI) in a device under test ("DUT") is disclosed. The DUT preferably forms part of an optical test system. The test system includes a light source, two back reflection paths, an output path, a lightwave signal analyzer and a computer. Before measuring MPI, the back reflection paths are calibrated. The input and output conditions are set and spectral data is collected. The spectral data is integrated to give a value for beat-noise power. The beat-noise power measurement allows generation of a crosstalk power ratio. The crosstalk power ratio is indicative of magnitude of multiple path interference.

16 Claims, 8 Drawing Sheets

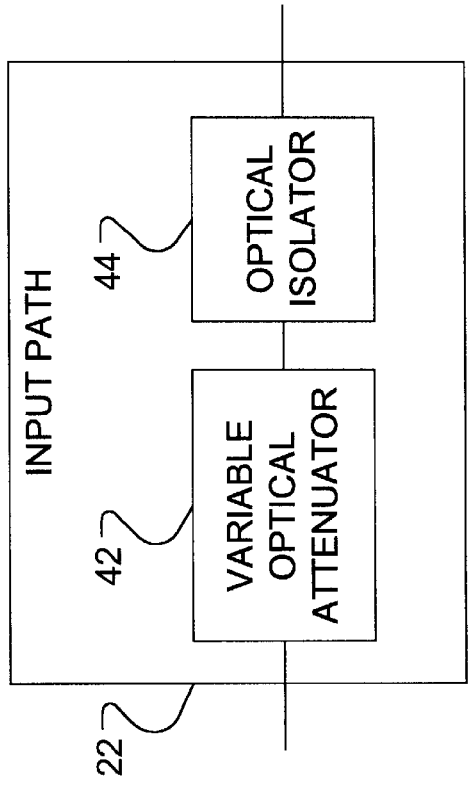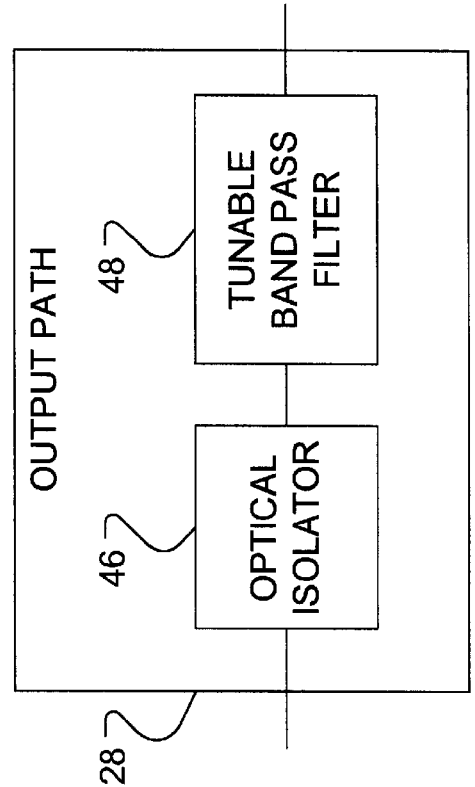

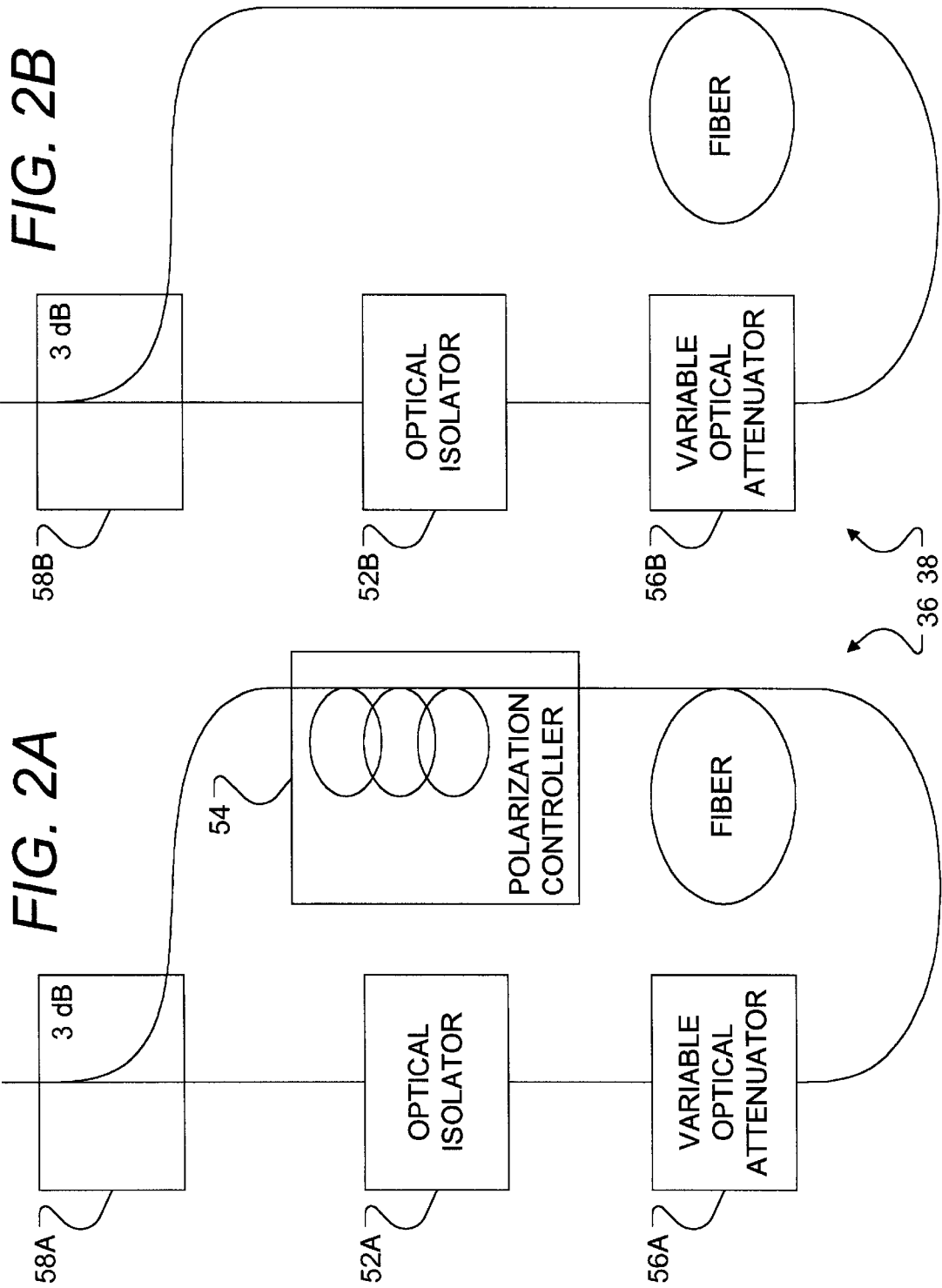

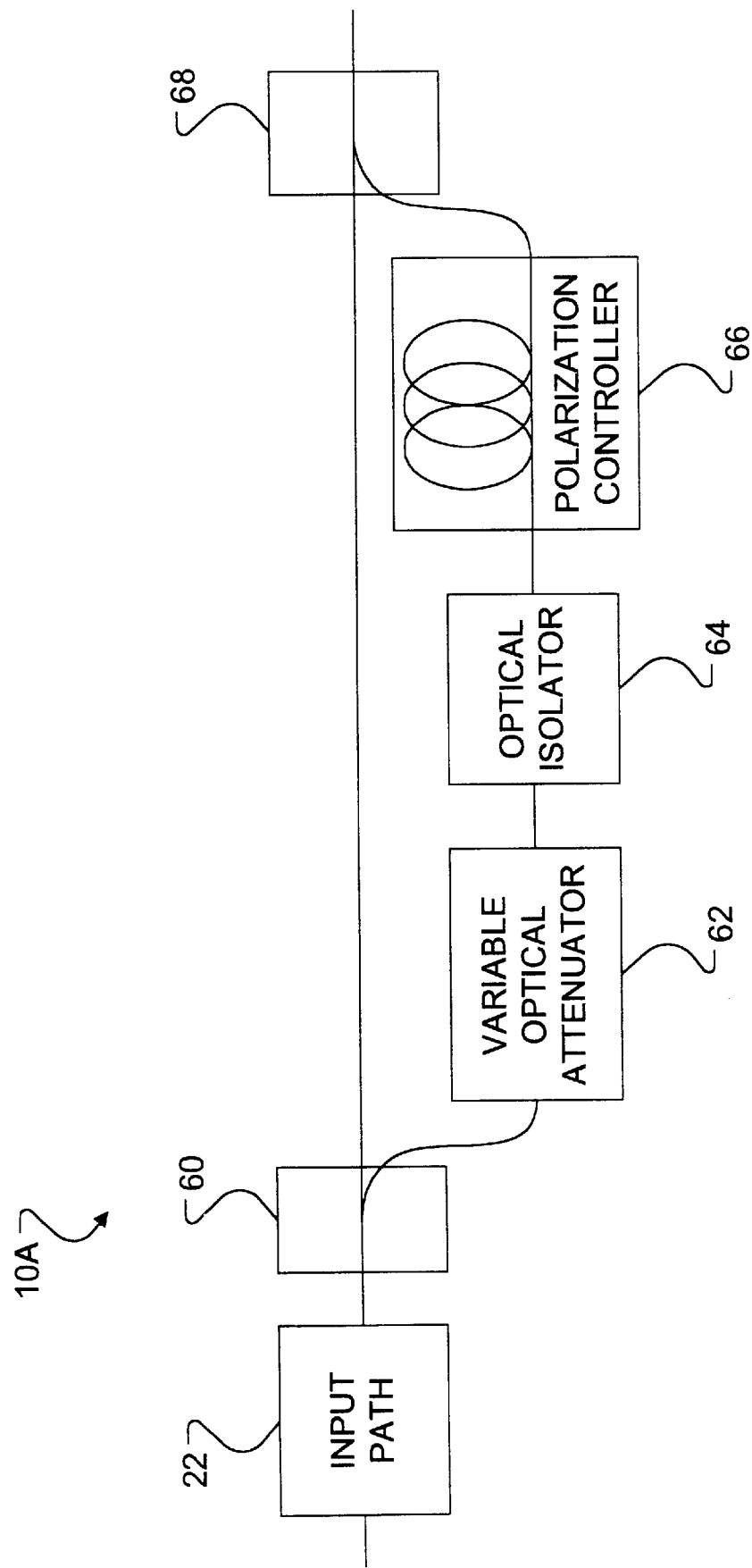

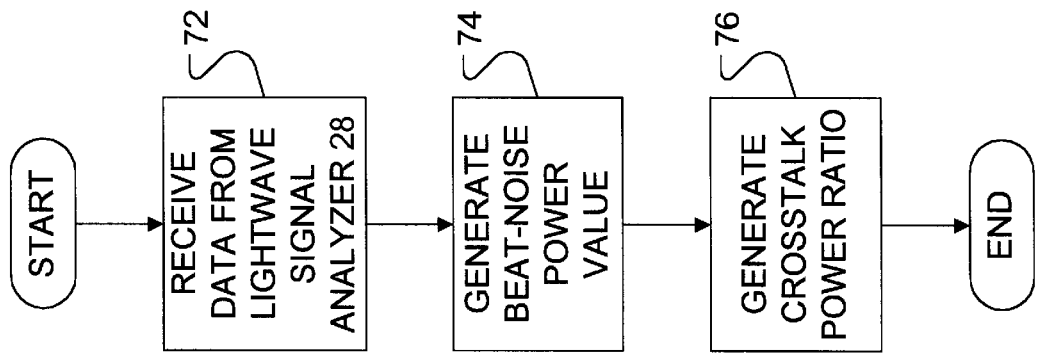

METHOD AND APPARATUS TO DETERMINE A MEASUREMENT OF OPTICAL MULTIPLE PATH INTERFERENCE

FIELD OF INVENTION

The present invention relates to optical systems and more particularly, to a method and apparatus for measuring multiple path interference attributable devices used in such systems.

BACKGROUND OF THE INVENTION

An optical system may use an optical fibre as a communication medium and light as an information carrier. For instance, an optical signal may be a beam of light modulated to represent binary information.

Optical signals may be employed in digital communication systems that exchange information as a series of binary digits called "bits". The reception of binary information is primarily concerned with the correct recognition of the value of a bit. Communication quality may be measured in terms of a bit error rate, a ratio of incorrectly recognized bits to correctly recognized bits.

Due to practical limits to the length of optical fibre, a continuous fibre may not reach from a sender to a receiver. As well, attenuation reduces the amplitude of an optical signal over a distance. To maintain an effective signal level, an optical communication link between a sender and a receiver may be broken into smaller individual links, called spans. To maintain a strong signal, an amplifier may be installed where each span is connected to a subsequent span.

The connection between the amplifier and the optical fibre may not be perfect. As a result, a small amount of the incident optical signal may reflect away from the destination end of a span rather than transmitting. Part of the reflected signal may then be reflected away from the source end of the span and may appear as a component of the original signal when received at the destination end. The detection of ones and zeroes of the original signal is made difficult by the combination of the original signal with the twice reflected interfering signal, referred to as multiple path interference (MPI). This increased detection difficulty elevates the bit error rate. Reflections may also be introduced in optical systems due to imperfections in individual devices such as the amplifiers, isolators, filters, optical switches, components within amplifiers, etc. Accordingly, methods and devices used to assess the effects of optical devices on MPI are known.

Mathematical predictions of the effect of MPI on an optical system often test the predictions using systems in which a controlled amount of MPI is introduced. In Gimlett and Cheung, "Performance Implications of Component Crosstalk in Transparent Lightwave Networks," (1994), *J. Lightwave Technology*, vol. 7, pp.888–895, a power penalty is derived dependent on a reflection coefficient that is representative the of amount of MPI relative to the original signal. In Goldstein et al., "Effects of Phase-to-Intensity Noise Conversion by Multiple Reflections on Gigabit-per-Second DFB Laser Transmission Systems," (1989), *IEEE Photonics Technology Letters*, vol. 6, pp.657–660., a power penalty is approximated dependent on a ratio of crosstalk (MPI) to signal power at a receiver. In both of the above, the power penalty is the increase in power necessary to obtain an error rate equivalent to the error rate in the absence of MPI.

U.S. Pat. No. 5,617,200 issued Apr. 1, 1997 to Vance describes a method for measuring the secondary path intensity of an optical device. The method includes applying a pulse of light to a first end of the device and detecting the light exiting from the second end of the device. The exiting light is analyzed in the time domain to determine a primary pulse intensity and a secondary pulse intensity. The ratio of the secondary pulse intensity to the primary pulse intensity provides a measure of the device's secondary path intensity.

The above methods however, do not take into account real in-field conditions to which a device may be subject. Specifically, in-field reflected optical signals may be present at both inputs and outputs of the device, that may be further reflected by the device.

Moreover, the measurement of a power penalty due to MPI may not be as indicative of the quality of the device as a measurement of the magnitude of MPI attributable to the device.

Finally, a measurement of MPI in the frequency domain may be preferable to an average of measurements of MPI made in the time domain.

The present invention accordingly attempts to address some of the shortcomings of known ways to measure MPI.

SUMMARY OF THE INVENTION

The present invention permits improved measurement of the magnitude of multiple path interference attributable to an optical device under test. An optical signal including a primary signal component (E1) and a reflected signal component (E2), preferably emanating from the device, are used to form an electrical signal, having a product signal component. The product signal component includes an electrical signal component representative of a product (E1×E2) of the primary signal component and the reflected signal component. A measurement of the magnitude of the power of the product signal component is determined and combined with a measurement of the power of the optical signal. The power measurements are used to determine an indicator of the magnitude of multiple path interference.

In accordance with an aspect of the present invention there is also provided an apparatus used to measure the amount of multiple path interference attributable to a device under test, in in-field like conditions. The apparatus includes at least one reflector that is in optical communication with an output port of the device under test, and reflects optical signals to produce an output optical signal, at the output of the device that has a reflected signal component. This simulates reflected signals that might be introduced by other optical component in communication with the device in in-field conditions. In the test apparatus, a measuring device, measures the magnitude of multiple path interference in the resulting output optical signal. The apparatus may also include another reflector, in optical communication with an input port of the device, and used to produce an optical signal having a reflected signal component at the input port.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In figures which illustrate example embodiments of the present invention invention:

FIG. 1C illustrates an input path used in the system of FIG. 1B;

FIG. 1D illustrates an output path used in the system of FIG. 1B;

FIG. 2A illustrates a first back reflector used in the system of FIG. 1B;

FIG. 2B illustrates a second back reflector used in the system of FIG. 1B;

FIG. 3 illustrates the optical test system of FIG. 1B modified for MPI measurement with a known crosstalk power ratio;

FIG. 6 is a flow diagram for the software control for the processor of FIG. 1A.

DETAILED DESCRIPTION

Figure 1A:
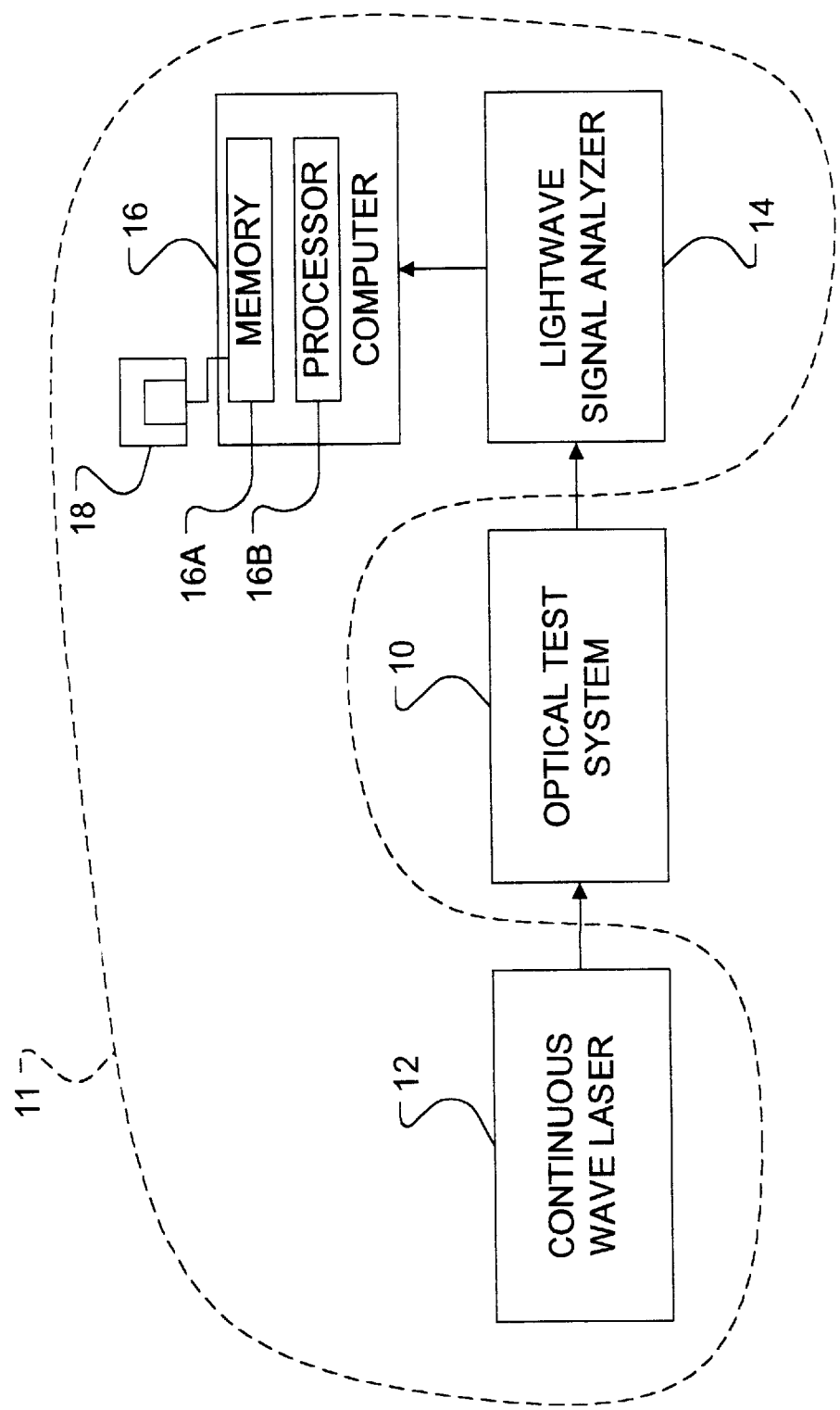
FIG. 1A illustrates an apparatus for MPI measurements exemplary of an embodiment of the invention.

FIG. 1A illustrates a simplified optical apparatus that may be used to measure multiple path interference attributable to a device under test ("DUT"), exemplary of a preferred embodiment of the present invention.

In FIG. 1A, continuous wave laser 12 acts as a light source in optical test apparatus 11. Laser 12 is preferably a single frequency semiconductor laser. Lineshape, linewidth and centre frequency characterize an electric field corresponding to the output of a laser, such as laser 12. Lineshape is the relationship between the frequency and magnitude of an electric field. Currently, lineshapes of most single frequency semiconductor lasers are accurately described by Lorentzian spectrum shapes. Linewidth is a measure of spectral broadening which may be caused by optical noise and modulation, while centre frequency is the frequency of the laser source.

At the destination end of optical apparatus 11 of FIG. 1A, the detection of the received signal at Lightwave Signal Analyzer ("LSA") 14 is performed by a photodiode detector (photodetector). Photocurrent generated in the photodetector, as a result of incident light at the photodetector, is proportional to the squared magnitude of the electric field. This property of the detector is termed the "square-law".

Continuous wave laser 12, with linewidth $\Delta v \approx 10$ MHZ, is in optical communication with an input path of an optical test system 10. LSA 14 is in optical communication with an output path of optical test system 10. LSA 14 is preferably an HP71400C made by the Hewlett-Packard Company of Palo Alto, Calif., used because of the low noise characteristic of the HP70810B Lightwave Section module. Output from a Hewlett-Packard Interface Bus ("HPIB") of LSA 14 is received by a computer 16. Computer 16 comprises a processor 16B and a memory 16A loaded with MPI measurement software for executing a method exemplary of this invention from software medium 18 which could be a disk, a tape, a chip or a random access memory containing a file downloaded from a remote source.

Figure 1B:
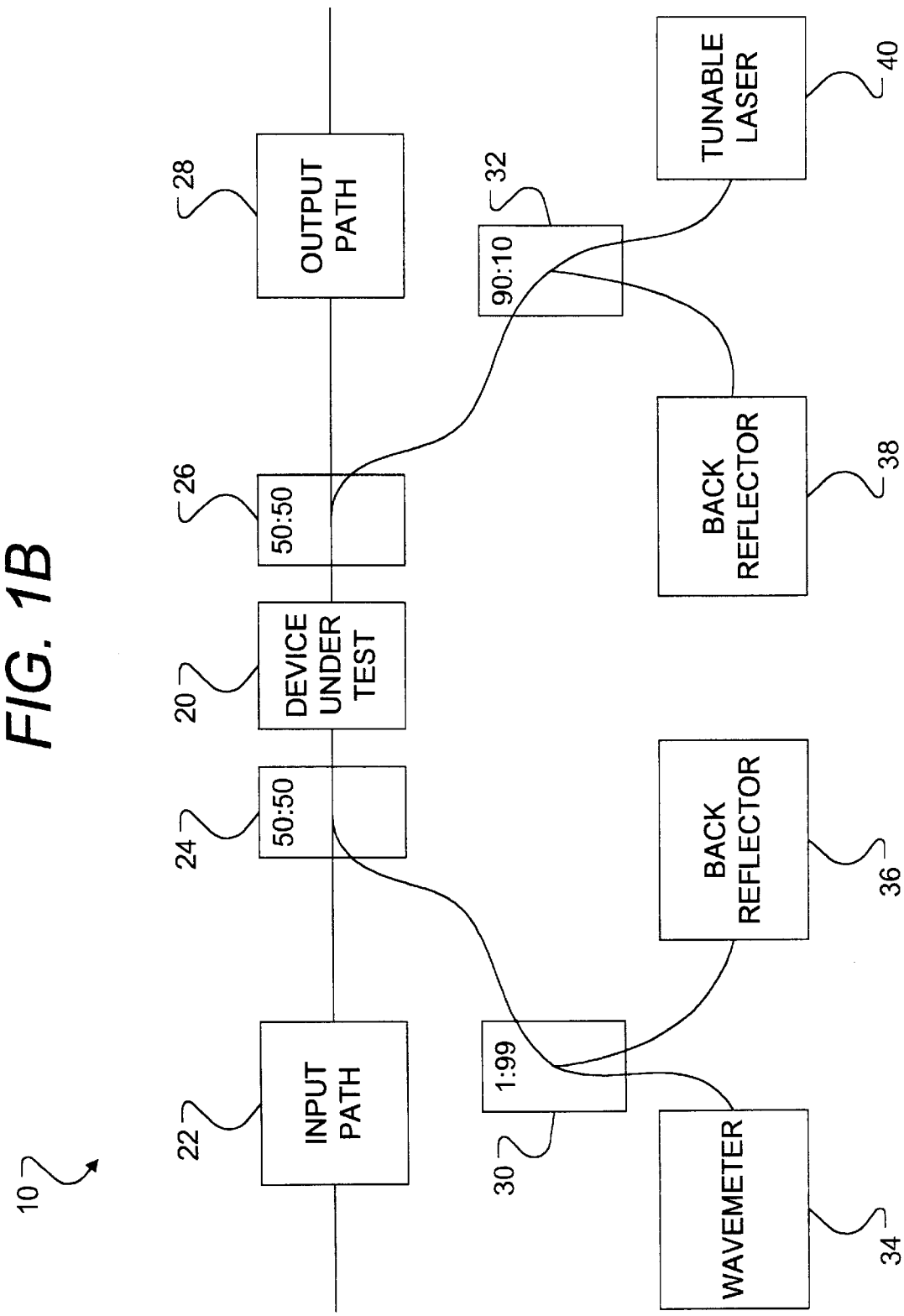
FIG. 1B illustrates an optical test system used in the apparatus of FIG. 1A.

Optical test system 10 is illustrated in detail in FIG. 1B. Input path 22 receives an incoming optical signal and is in optical communication with an input port of a "DUT" 20 through a directional coupler 24. DUT 20 may be an optical amplifier (such as a MOR Erbium Doped Fibre Amplifier from NORTEL NETWORKS of Ottawa, Canada) or any optical component or combination of components such as optical filters, sources, detectors and switches. Accordingly, DUT 20 may be a single port DUT, having only an output port.

Directional couplers 24, 26, 30, and 32 allow optical energy from two sources to be combined in a predetermined proportion. Directional coupler 24 combines a signal from input path 22 with a signal from a first back reflection path in a 50:50 proportion. Output from a port of DUT 20 is split in a 50:50 proportion between a second back reflection path and output path 28. The first back reflection path includes directional coupler 30 which combines, in a 99:1 proportion, optical signals from a first back reflector 36 and a wavemeter 34. Second back reflection path includes directional coupler 32 which combines, in a 90:10 proportion, optical signals from second back reflector 38 and a tunable laser 40.

Preferably, tunable laser 40 has a linewidth like that of a semiconductor laser, capable of output at a wide range of wavelengths. As will become apparent, tunable laser 40 is employed to approximate an environment wherein many optical signals may be transmitted bidirectionally on a single fibre at once by transmitting each optical signal on a different wavelength of light.

Wavemeter 34 may, for example, be an HP86120A made by the Hewlett-Packard Company. Wavemeter 34 is used to monitor the level of optical energy at various wavelengths.

Input path 22 comprises, as illustrated in FIG. 1C, a variable optical attenuator 42, which reduces the amplitude of a wave without causing significant distortion, and an optical isolator 44, which prevents return reflections along a transmission path back into continuous wave laser 12 (FIG. 1A).

Output path 28 comprises, as illustrated in FIG. 1D, an optical isolator 46 and a tunable band-pass filter 48, whose transmission is high for a particular band of frequencies but low for frequencies above and below this band. Tunable band-pass filter 48 reduces broadband optical noise known as amplified spontaneous emission (ASE) emitted by laser 12.

First back reflector 36, an assembled polarization-controlled back reflector as shown in FIG. 2A, and second back reflector 38, an assembled back reflector as shown in FIG. 2B, have several components in common. Each have a directional coupler 58A, 58B in optical communication with an optical isolator 52A, 52B which is in optical communication with a variable optical attenuator 56A, 56B. In second back reflector 38, optical fibre from variable optical attenuator 56B couples directly to directional coupler 58B. First back reflector 36 comprises an additional component which is a polarization controller 54 connected in the optical path between variable optical attenuator 56A and directional coupler 58A. As will be apparent, polarization controller 54 may be used to adjust the polarization of the signal reflected by first back reflector 36 to maximize the magnitude of interference with a primary signal hereafter disclosed.

A JDS Series 9000 Variable Back Reflector by JDS/Fitel of Nepean, Ontario, Canada may be used as second back reflector 38 rather than an assembled back reflector.

As will become apparent, apparatus 11 may be used to measure a magnitude of MPI attributable to DUT 20. The measurement of the magnitude of MPI may be better understood in light of the following analysis.

The total electric field $E_T(t)$ signal received at LSA 14 (FIG. 1A) resulting from a signal produced by laser 12 is made up of a primary component $E_1(t)$ and a reflected component $E_2(t)$, $$E_T(t) = E_1(t) + E_2(t) \tag{1}$$

where $$E_1(t) = \sqrt{\sqrt{P_1}} e^{j[\omega t + \psi_1(t)]} \text{ and } E_2(t) = \sqrt{\sqrt{P_2}} e^{j[\omega t + \psi_2(t)]} \tag{2}$$

represent the primary signal component and the reflected signal component, respectively, $\omega$ is the laser centre frequency and where $\psi_1(t)$ and $\psi_2(t)$ are the optical phase of the primary signal and the reflected signal respectively. $P_1$ and $P_2$ represent the optical powers of their respective signals (i.e., the power that would be received if either signal was detected separately). The frequency spectrum of the reflected signal component $E_2(t)$, because it is simply a delayed version of the signal produced by laser 12, has the same linewidth and centre frequency as the primary signal component $E_1(t)$ (i.e., corresponding to the signal produced by laser 12).

The mixing of the primary signal and the reflected signal is accomplished as a result of the square-law nature of the photodiode. The resulting photocurrent spectrum, comprising an electric product signal component of $E_1 \times E_2$ called beat-noise, is an autocorrelation of the laser's electric field spectrum and is commonly referred to as a delayed self-homodyne (see Douglas Barney, Wayne Sorin, "Linewidth and Power Spectral Measurements of Single Frequency Lasers," Hewlett Packard Journal, February 1990, the contents of which are incorporated herein by reference). For the case of an electric field spectrum having a Lorentzian spectrum shape, the autocorrelation function also has a Lorentzian spectrum shape and has a linewidth exactly twice that of the original line shape.

From D. Derickson, (1997), Fiber Optic Test and Measurement, Prentice-Hall, the contents of which are incorporated herein by reference, the photocurrent generated in the detector at LSA 14 is:

$$i(t)=\eta |E_T(t)|^2 \qquad (3)$$

where $\eta$ is the detector responsivity given by $$\eta = \frac{\eta_0 q}{h\upsilon}[A/W] \qquad (4)$$

with parameters including $\eta_0$ as the conversion efficiency (from photons to electrons) of the detector at LSA 14, q as electronic charge (q=1.6×10$^{-19}$ C) and h$\upsilon$ as photon energy (h=6.63×10$^{-34}$ J, $\upsilon$=c/$\lambda$, where c is the speed of light, 3×10$^8$ m/s, and $\lambda$ is wavelength). The photocurrent in terms of $P_1$ and $P_2$, can be written $$i(t)=\eta\{P_1+P_2 2\sqrt{P_1 P_2} \cos \lfloor \psi_1(t) \rfloor\}. \qquad (5)$$

The product signal component of equation (5) is called the beat-noise, $$i_B(t)=2\eta\sqrt{P_1 P_2}\cos \lfloor \Delta\psi(t) \rfloor \qquad (6)$$

where $\Delta\psi(t)=\psi_1(t)-\psi_2(t)$ The beat-noise power at a load resistance $R_L$ at LSA 14 is then $$S_B(t) = i_B^2(t)R_L \qquad (7)$$

$$= 4\eta^2 P_1 P_2 R_L \cos^2[\Delta\varphi(t)].$$

Since $\Delta\psi(t)$ is a random process, the average beat noise power at the load resistor is then $$S_B=2\eta^2 P_1 P_2 R_L. \qquad (8)$$

With the reflected signal power $P_2=\gamma P_1$ ($\gamma$ is the crosstalk power ratio), equation (8) becomes $$S_B=2\eta^2 \gamma P_1^2 R_L. \qquad (9)$$

When $P_2 \ll P_1 (\gamma \ll 1)$, the received signal power, $P_{optavg}$, at the photo detector may be approximated as $P_1$. Thus, $$S_B = k\gamma(P_{optavg})^2 \qquad (10)$$

$$\gamma = \frac{S_B}{k(P_{optavg})^2} \qquad (11)$$

where k is a constant related to photo-detector responsivity and load resistance:

$$k=2\eta^2 R_L. \qquad (12)$$

In operation, the value of k for optical apparatus 11 is first determined. Thereafter, back reflectors 36 and 38 are calibrated to introduce a desired amount of reflections into system 10, thereby subjecting DUT 20 to in-field operation conditions. Finally, the input and output conditions are set for DUT 20, and MPI measurements are taken.

Illustrated in FIG. 3, modified optical test system 10A is used in place of optical test system 10 of FIG. 1A in order to determine k. As illustrated, a signal from continuous wave laser 12 is split into an upper arm and a lower arm, in a 50:50 proportion, so that a delay may be introduced. Specifically, the upper arm passes optical signal directly from first coupler 60 to second coupler 68. The lower arm comprises variable optical attenuator 62 in optical communication with optical isolator 64 which is optically connected to polarization controller 66. The optical path in the lower arm is significantly longer than the optical path of the upper arm in order to introduce the delay. The delayed signal has the same characteristics as a multiply reflected signal. Signal from the lower arm is coupled with signal from the upper arm in a $\gamma$:100-$\gamma$ proportion by use of attenuator 62 so that a resulting optical signal includes a known amount of a signal representative of reflections. LSA 14 receives the resulting optical signal and communicates related data to computer 16. (FIG. 1)

The arrangement of FIG. 3, in combination with the apparatus in FIG. 1, is now used to determine the value of k, given by rearranging equation (11) to yield $$k = \frac{S_B}{\gamma(P_{optavg})^2}. \qquad (13)$$

The beat-noise power, $S_B$, is determined at computer 16 by numerical integration of samples of a signal generated at LSA 14 (as described in detail hereafter), the crosstalk power ratio $\gamma$ is known (from the setting of the second coupler 68) and $P_{optavg}$ is determined by LSA 14 and communicated to computer 16. Finally, the value of k is determined as the slope of the plot of $S_B$ vs. $\gamma(P_{optavg})^2$.

Once k has been determined, apparatus 11 may be used to determine the amount of MPI attributable to a DUT 20 in the presence of controlled amounts of reflections at the input port and output port of DUT 20. The following outlines a procedure used to adjust the instruments to a set of controlled values of reflections at the input port and output port of DUT 20. The procedure includes calibrating back reflectors 36 and 38 to −24 dB, 10 dB below the value for clean, open fibre connections (which are assumed to cause −14 dB reflections). By setting the back reflectors in this way, the losses in directional couplers 24, 26, 30, 32 and most of the connectors will be included in the calibration.

Reflections of the order −24 dB are chosen to conform to the worst case specifications of the environment for the amplifier acting as DUT 20 in this case. For cases in which DUT 20 is a different amplifier or is an optical device other than an amplifier, reflection values may be governed by a different set of specifications.

A risk exists that the two connections made to DUT 20 will result in reflections not observed during setup and calibration. Care and attention to connector hygiene is therefore crucial for these connections. As well, use of a sensitive optical power meter for calibration is important, preferably an HP8153A made by the Hewlett-Packard Company is used. Another component of the procedure involves setting the input to, and output from, DUT 20.

Figure 4:
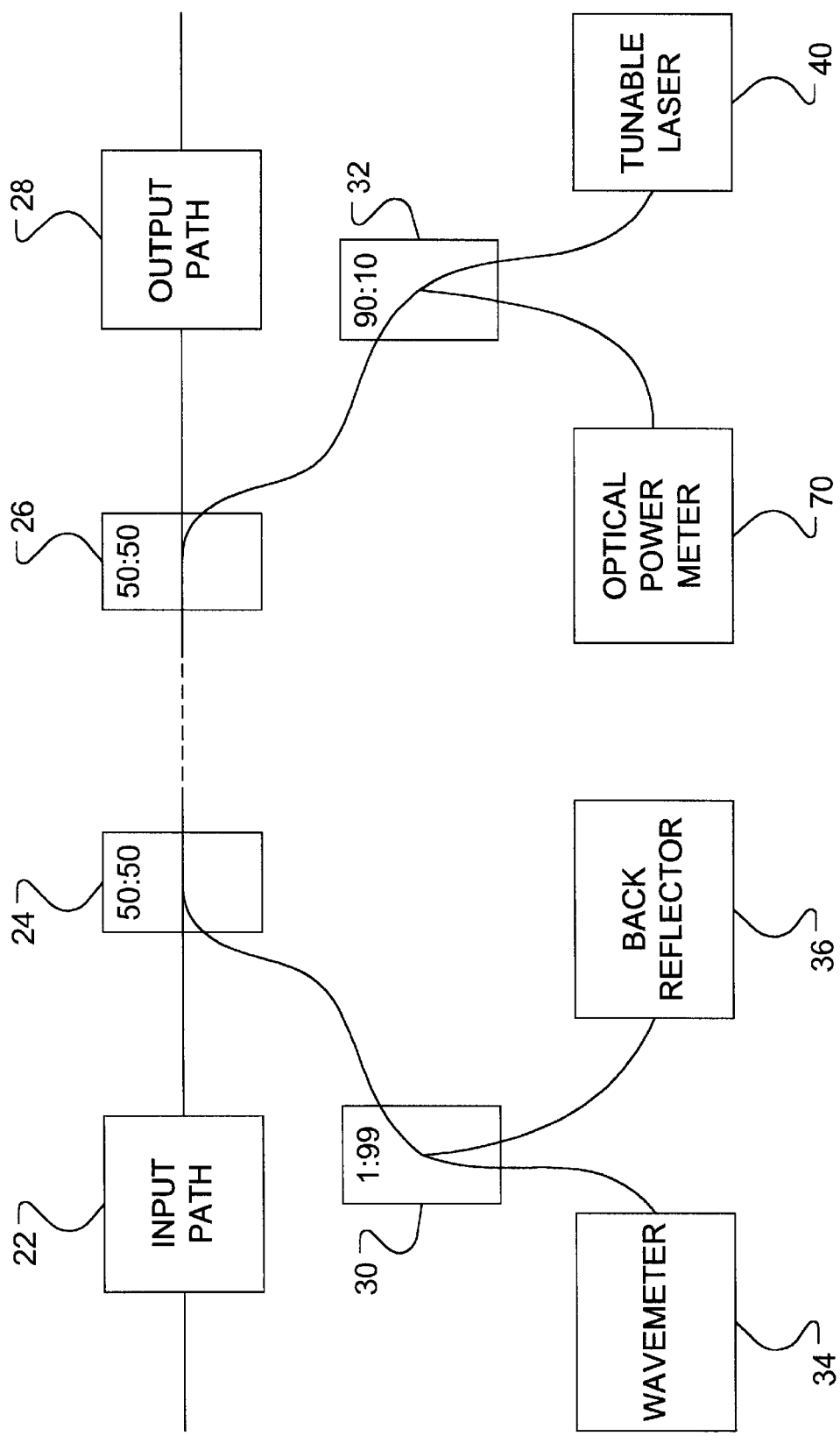
FIG. 4 illustrates the optical test system of FIG. 1B modified for calibration of a first back reflector.

FIG. 4 represents optical test system 10 of FIG. 1B altered for the calibration of first back reflector 36. Calibration is begun by setting variable optical attenuator 42 of path 22 (FIG. 1C) to ∞ to remove the effect of continuous wave test laser 12 (FIG. 1A). The fibres connecting DUT 20 to system 10 are then disconnected from DUT 20 and the fibre ends are cleaned. A conventional optical power meter 70 is inserted in place of second back reflector 38. Tunable laser 40 is set to a test wavelength and the power is increased to maximum. A first reading on optical power meter 70 is recorded. Variable optical attenuator 56A (FIG. 2A) in first back reflector 36 is set to 0 dB. The fibres disconnected from DUT 20 are connected, bypassing DUT 20. Polarization controller 54 (FIG. 2A) on first back reflector 36 is adjusted to maximize the reading on optical power meter 70. Variable optical attenuator 56A (FIG. 2A) in first back reflector 36 is adjusted until the reading on optical power meter 70 is a value 10 dB lower than the first reading. In this way, first back reflector 36 is set to mimic −24 dB of reflection resulting from an optical network preceding DUT 20 having lengths of optical fibres connecting various optical devices. Finally, optical power meter 70 is disconnected and second back reflector 38 is reconnected.

Figure 5:
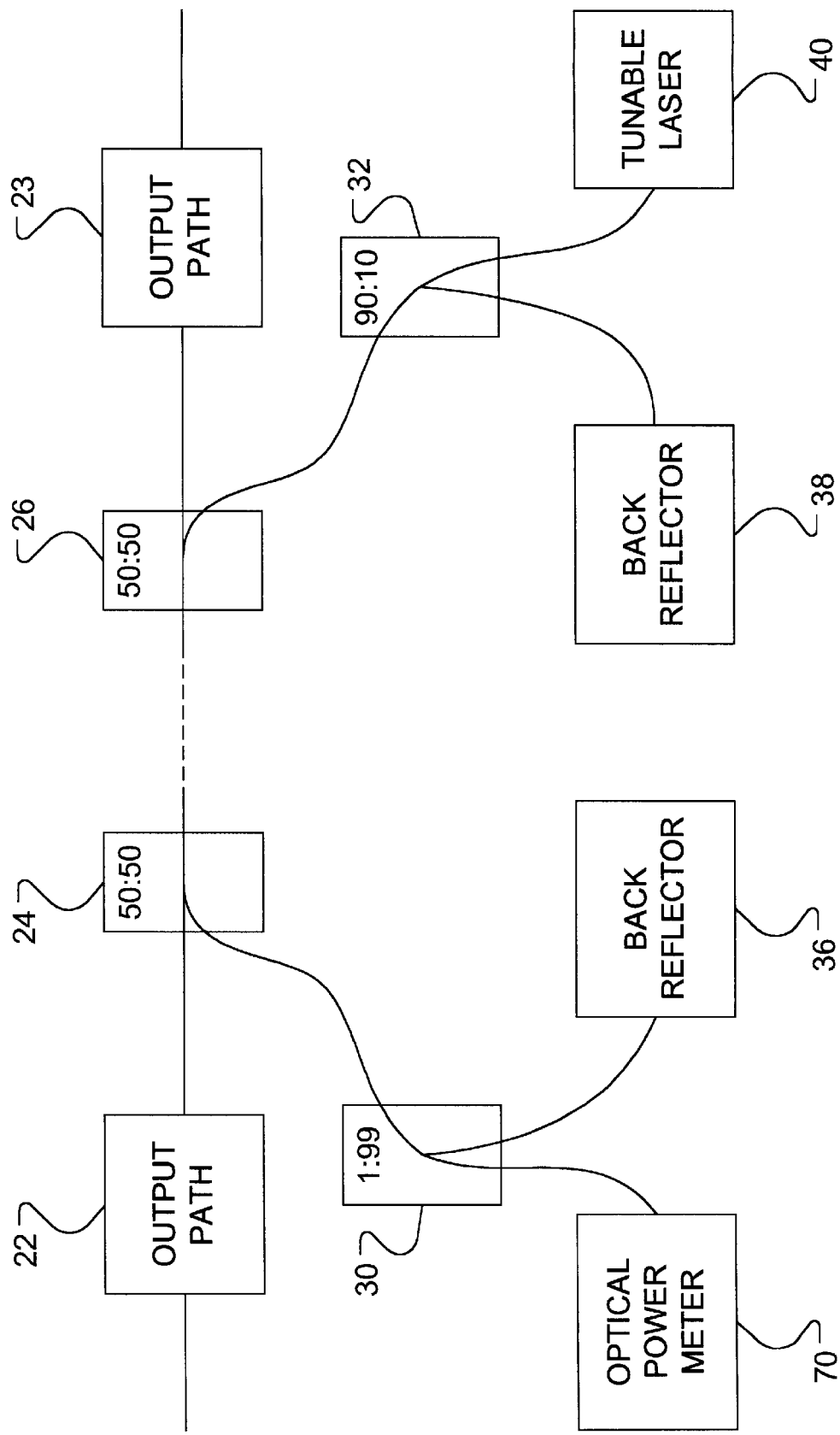
FIG. 5 illustrates the optical test system of FIG. 1B modified for calibration of a second back reflector.

FIG. 5 represents optical test system 10 of FIG. 1A altered for the calibration of second back reflector 38. Calibration is begun by disabling tunable laser 40. Variable optical attenuator 42 is then set to 0 dB to provide maximum power from continuous wave laser 12. The fibres from DUT 20 are disconnected and the fibre ends cleaned. Wavemeter 34 is replaced by optical power meter 70. A second reading on optical power meter 70 is recorded. The fibres disconnected from DUT 20 are connected, bypassing DUT 20. Variable optical attenuator 56B (FIG. 2B) in second back reflector 38 is adjusted until the reading on optical power meter 70 is a value 10 dB lower than the second reading. In this way, second back reflector 38 is set to mimic reflections resulting from an optical network following DUT 20 having lengths of optical fibres connecting various optical devices. Optical power meter 70 is disconnected and wavemeter 34 is reconnected. Tunable laser 40 is reenabled.

Returning to FIG. 1B, input signals to DUT 20 are now set. Tunable laser 40 wavelength is set to an "other" wavelength, and therefore an "other" centre frequency. Tunable laser 40 power is adjusted to obtain −19 dBm using optical power meter 70 in place of DUT 20. variable optical attenuator 42 of input path 22 (FIG. 1C) is adjusted to obtain −19 dBm from continuous wave laser 12. DUT 20 is inserted, making certain that the connectors have been properly cleaned, and adjusted to give an output of +8 dBm.

The values −19 dBm and +8 dBm, for input and output respectively, are chosen to conform to the maximum amplification specifications of the environment for the amplifier acting as DUT 20 in this case. For cases in which DUT 20 is a different amplifier or is an optical device other than an amplifier, input and output values may be governed by a different set of specifications.

Once the back reflection paths have been calibrated and the input and output levels set, optical apparatus 11 may be used to measure MPI in optical test system 10 and therefore attributable to DUT 20 in the presence of reflections. LSA 14 is set up to collect the beat-noise spectrum. An HP71400C Lightwave Signal Analyzer 14 can display power in optical or electrical units, but it is important to use electrical units for MPI measurement because of the way in which the expression for $S_B$ was derived (from beat-noise photocurrent). Thus, LSA 14 is set to "Lightwave Elec" and "Linear Pwr". The latter setting avoids display of the data on a quadratic voltage scale.

A frequency range, of measurements on LSA 14, is chosen to be approximately five times the linewidth (Δv) of continuous wave laser 12 used as a test signal. In this case, Δv≈10 MHz so LSA 14 stop frequency is set to be 50 MHz. Furthermore, the "BLANKSTART" function is used to zero the first 4 MHz of displayed spectrum, so that the local oscillator peak (at 0 Hz) does not dominate the spectrum and interfere with the setting of a reference level. Resolution bandwidth (RBW) should be set on LSA 14 to be much smaller than the linewidth, in this case 300 kHz is used.

FIG. 6 is a flow diagram for software control for processor 16B of FIG. 1A. Spectra are collected at 0–50 MHz and 950 MHz–1 GHz. The high-frequency spectrum is collected to measure the background level. In data analysis, an average background is subtracted from the 0–50 MHz data. 800 points are transferred from LSA 14 to processor 16B (step 72) of which the first 64 have been zeroed by the BLANKSTART function.

Processor 16B generates a value for the beat-noise power from the beat-noise electrical spectrum by numerically integrating the collected data (step 74). In this embodiment, data manipulation on computer 16 is handled in a graphical, programming development environment called LabVIEW, by National Instruments of Austin, Tex. Steps for generating a value for beat-noise power from the spectra include:

(a) Receiving data from LSA 14 for 0–50 MHz and 950 MHz–1 GHz spectra (in Lightwave electrical linear power units).

(b) Calculating average background noise power from the 950 MHz–1 GHz data.

(c) Calculating summed self-homodyne power per spectrum analyzer RBW according to:

$$\text{summed\_SH} = \left(\left(\sum_{0}^{799} y_i\right) - 736 \cdot \text{avg\_bkgrnd}\right) \cdot df \tag{14}$$

where $y_i$ are the data elements in W/RBW, df is the data frequency step size in MHz and avg_bkgrnd is the average background in W/RBW.

(d) Calculating beat-noise power, $S_B$, according to:

$$S_B = \text{summed\_SH} \cdot \text{finite\_cf} \cdot \text{RBW} \tag{15}$$

where finite_cf is a finite correction factor.

The finite correction factor in step (d) arises because the data is only being collected from 4 to 50 MHz, and should, in theory, be integrated from 0 to ∞. This correction factor depends on the linewidth of continuous wave laser 12 and the data range and is ~1.58 for a linewidth Δv≈10 MHz. The correction factor is the ratio of a Lorentzian function integrated over all frequencies to a Lorentzian function integrated from 4 to 50 MHz.

Optionally, the extraction of the beat-noise power from the beat-noise electrical spectrum can be achieved by fitting the data to a particular mathematical function (i.e. a Lorentzian) and integrating analytically using look up tables or other known techniques.

Once processor 16B has calculated the beat-noise power at LSA 14, processor 16B generates a crosstalk power ratio (step 76, FIG. 6) from $$\gamma = \frac{S_B}{k(P_{optavg})^2}. \tag{16}$$

The generated γ is compared to a value of −50 dB as a specification for an upper limit of permissible crosstalk power ratio. This upper limit is for an optical test system, incorporating a DUT whose input and output levels have been set as above, in which the controlled amounts of reflections previously disclosed have been introduced. If the generated γ is less than the upper limit, computer 16 indicates that DUT 20 meets the specification. If the generated γ is greater than the upper limit, computer 16 indicates that DUT 20 fails to meet the specification.

In equation 16, the average optical power ($P_{optavg}$) should be that of the test signal only. If ASE represents a significant fraction of the total optical power, then the ASE power should be subtracted by computer 16 from $P_{optavg}$ before calculating γ. If using a narrow band pass filter 48, the ASE power would have to be very large before it affects the value of $P_{optavg}$ measured at LSA 14. In all expected system configurations, the use of a narrow filter will obviate the need for independent measurement of the ASE power when calculating γ.

A person skilled in the art will appreciate that numerous modifications to the above embodiments are possible without departing from the scope of the present invention. Specifically, LSA 14 and computing device 16 could be replaced by suitable analog equipment that forms a product signal (E1×E2) from a primary and reflected optical components and then determines its power. This might be accomplished by a conventional photodetector having an electrical output in communication with a low-pass filter, whose output is integrated in the frequency domain over a suitable frequency range.

Other modifications will be apparent to those skilled in the art and, therefore, the invention is defined in the claims.

What is claimed is:

1. An apparatus for measuring multiple path interference attributable to a device under test ("DUT"), said DUT producing a composite optical signal at its output, equaling the sum of a first optical signal and a second optical signal component, said second optical signal component attributable to back reflection at said output, said apparatus comprising:
    a first back reflector in optical communication with said output of said DUT for at least partially reflecting said composite optical signal, to said output;
    a photodetector for receiving said composite optical signal; and
    a measuring system for measuring a magnitude of multiple path interference in said composite optical signal.

2. The apparatus of claim 1 further comprising a first optical signal source in optical communication with an input of said DUT.

3. The apparatus of claim 2, further comprising a second optical signal source in optical communication with said DUT.

4. The apparatus of claim 1 wherein said measuring system comprises an optical detector for converting said composite optical signal to an electrical signal.

5. The apparatus of claim 1 further comprising a second back reflector in optical communication with an input of said DUT for reflecting optical signals to produce an optical signal, at said input of said DUT, having a reflected signal component.

6. The apparatus of claim 1, wherein said measuring system comprises a computing device in communication with said photodetector to receive an electrical signal attributable to said composite optical signal at said photodetector, and adapted to:
    determine a magnitude of power in said electric signal proportional to a product (E1×E2) of a magnitude of said first optical signal component (E1) and a magnitude of said second optical signal component (E2);
    determine a magnitude of power of said composite optical signal; and
    calculate an indicator of a magnitude of multiple path interference in said composite optical signal from said magnitude of power of said magnitude of power in said electric signal proportional to said product and said magnitude of power of said composite optical signal.

7. Apparatus for measuring magnitude of multiple path interference in an optical test system, said apparatus comprising:
    a light source optically connected to a port of said optical test system;
    means for forming an electrical signal from an optical signal at a port of said optical test system, said electrical signal having a product signal component attributable to a product (E1×E2) of a primary optical signal component (E1) and a reflected optical signal component (E2) in said optical signal;
    a computer, in communication with said electrical signal forming means, said computer including a processor operable to:
        determine a magnitude of power of said product signal component;
        determine a magnitude of power of said optical signal; and
        calculate an indicator of a magnitude of multiple path interference in said optical signal from said magnitude of power of said product signal component and said magnitude of power of said optical signal.

8. The apparatus of claim 7 wherein said light source comprises a continuous wave laser.

9. An apparatus for measuring multiple path interference attributable to a device under test ("DUT"), said DUT comprising an optical output and producing a composite optical signal at said optical output, said composite optical signal equaling a sum of a first optical signal component and a second optical signal component, said second optical signal component attributable to back reflection at said optical output, said apparatus comprising:
    a first back reflector in optical communication with said optical output arranged to at least partially reflect said composite optical signal to said optical output;
    a photodetector receiving said composite optical signal, and operable to form an electrical signal including an electric signal component proportional to a product (E1×E2) of a magnitude of power of said first optical signal component and a magnitude of power of said second optical signal component;
    a measuring system in communication with said photodetector to receive said electrical signal, said measuring system comprising a processor operable to:
        determine a magnitude of power in said electrical signal attributable to said product (E1×E2);
        determine a magnitude of power of said composite optical signal; and calculate an indicator of a magnitude of multiple path interference in said composite optical signal from said magnitude of power in said electrical signal attributable to said product and said magnitude of power of said composite optical signal.

10. The apparatus of claim 9, wherein said processor is operable to:
   i. sample a magnitude of said electrical signal as a function of frequency;
   ii. integrate samples of said electrical signal in the frequency domain to determine said magnitude of power of said product signal component.

11. The apparatus of claim 10, wherein said processor is operable to take a ratio of said magnitude of power in said electrical signal attributable to said product and the square of the magnitude of power of said composite optical signal.

12. The apparatus of claim 11, wherein said processor is further operable to multiply said ratio by a constant related to physical characteristics of said photo detector.

13. The apparatus of claim 10, wherein said processor approximates integrating said samples from zero hertz to infinity, to integrate said samples.

14. The apparatus of claim 13, wherein said processor analytically integrates said samples by fitting said samples to a known mathematical function.

15. The apparatus of claim 13, wherein said processor numerically integrating said samples.

16. The apparatus of claim 10, further comprising a filter to filtering said optical signal to limit noise in said photodetector signal caused by broadband optical noise in said optical signal.

* * * * *